United States Patent [19]

Baris et al.

[11] 4,150,076
[45] Apr. 17, 1979

[54] FUEL CELL ELECTRODE AND METHOD OF MANUFACTURE OF SHEET MATERIAL FOR USE THEREIN

[75] Inventors: Johannes M. Baris, Durham, Conn.; Charles D. Iacovangelo, Schenectady, N.Y.; Wolfgang M. Vogel, Glastonbury, Conn.

[73] Assignee: United Technologies Corporation, Hartford, Conn.

[21] Appl. No.: 799,584

[22] Filed: May 23, 1977

Related U.S. Application Data

[62] Division of Ser. No. 752,417, Dec. 20, 1976, Pat. No. 4,058,482.

[51] Int. Cl.$^2$ ............................................. B29D 27/00
[52] U.S. Cl. .................................... 264/49; 264/127; 429/42
[58] Field of Search .................... 264/99, 127; 429/42

[56] References Cited

U.S. PATENT DOCUMENTS

| | | | |
|---|---|---|---|
| 3,281,511 | 10/1966 | Goldsmith | 264/49 |
| 3,282,737 | 11/1966 | Hintermann et al. | 429/42 X |
| 3,518,332 | 6/1970 | Sklarchuk et al. | 264/49 |
| 3,556,161 | 1/1971 | Roberts | 264/49 X |
| 3,627,859 | 12/1971 | Mesite et al. | 264/49 |
| 3,632,704 | 1/1972 | Coll-Palagos | 264/49 |
| 3,661,645 | 5/1972 | Strier et al. | 264/49 X |
| 3,702,267 | 11/1972 | Grot | 264/49 X |
| 3,773,878 | 11/1973 | Jahnke | 264/49 |
| 3,778,313 | 12/1973 | Reber et al. | 264/49 X |
| 3,890,417 | 6/1975 | Vallance | 264/127 X |
| 3,930,886 | 1/1976 | Mesiti et al. | 264/49 X |
| 3,930,979 | 1/1976 | Vallance | 264/49 X |
| 3,943,006 | 3/1976 | Baker et al. | 264/49 X |
| 3,979,227 | 9/1976 | Katz et al. | 429/42 X |
| 3,980,613 | 9/1976 | Bachot et al. | 264/49 X |
| 4,031,041 | 6/1977 | Bouy et al. | 264/127 X |
| 4,043,933 | 8/1977 | Breault et al. | 429/42 X |
| 4,044,193 | 8/1977 | Petrow et al. | 429/42 X |

OTHER PUBLICATIONS

Kortum, G and J. O'M. Bockris, "Textbook of Electrochemistry", vol. II, New York, Elsevier Publishing Co., 1951, p. 566.

*Primary Examiner*—Philip Anderson

[57] ABSTRACT

A sheet material, principally comprised of a polymer such as polytetrafluoroethylene, having characteristics which permit its use in a fuel cell electrode is formed from co-agglomerates of the polymer and a pore former. In a fuel cell electrode application, the polymer-pore former agglomerates are themselves caused to co-agglomerate with a catalyst, the resulting co-agglomerates are formed into a layer and the pore former is leached from the layer so as to produce a structure having gas channels only in the polymer portions thereof. Agglomeration of the pore former and polymer particles is permitted through first imparting a positive charge to the pore former particles. The gas permeable catalyst layer will be bonded to a support plate to define a fuel cell electrode.

7 Claims, No Drawings

FUEL CELL ELECTRODE AND METHOD OF MANUFACTURE OF SHEET MATERIAL FOR USE THEREIN

This is a division, of application serial No. 752,417, filed Dec. 20, 1976 now U.S. Pat. No. 4,058,482.

BACKGROUND OF THE INVENTION (1) Field of the Invention

The present invention relates to the production of sheet material and particularly to the manufacture of such material having characteristics which render it suitable for application in or as electrodes for use in electrochemical devices such as fuel cells. More specifically, the present invention is directed to catalyst containing polytetrafluoroethylene electrodes which exhibit greater resistance to flooding in open circuit air potentials than has characterized previous devices of similar character. Accordingly, the general objects of the present invention are to provide novel and improved methods and articles of such character.

(2) Description of the Prior Art

While not limited thereto in its utility, the technique of the present invention is particularly well suited for use in the production of fuel cell electrodes. As is well known in the art, fuel cells produce, from a fuel and oxidant, electrical energy. In its most simplified form, the fuel cell consists of a housing, an oxidizing electrode, a fuel electrode and an electrolyte disposed between and in contact with the two electrodes. In operation, it is necessary that the fuel and oxidant contact a first surface of their respective electrodes, where a process of adsorption and de-adsorption occurs, leaving the electrodes electrically charged. The second surfaces of the electrodes; i.e., the facing surfaces; will be in contact with the electrolyte which may be trapped in a porous sheet known in the art as the matrix. Depending upon the nature of the electrolyte, ions are transferred through the electrolyte from the anode to the cathode or from the cathode to the anode thereby enabling the withdrawal of electrical current from the cell.

In order to obtain optimum performance from a fuel cell, the electrodes must insure optimum contact of reactant gas, electrolyte and electrode reaction sites for minimum electrode polarization. The electrodes will include a catalyst and in order to get electrolyte to the reaction sites the catalyst must be wetted by the electrolyte. In order to get the reactant or oxidant gas to the reaction sites it is also necessary to have gas channels or pores in the electrodes. These gas channels must not become filled with electrolyte, in which case gas transfer would be blocked, and must thus by hydrophobic. The electrodes must, additionally, have sufficient mechanical strength to withstand the operating environment without fracture and have a low bubble pressure.

In the interest of providing electrodes having the above briefly described characteristics, resort has typically been had to the formation of bi-layer electrode structures. In such bi-layer electrodes the layer which is exposed to the reactant gas will typically be comprised of a "carbon paper" which has been treated so as to render it hydrophobic. As used herein the term "carbon paper" refers to a sheet material consisting of carbon fibers which have been bonded together to form a gas permeable paper-like structure having sufficient strength to function as a support plate for the electrode. The second layer, which is bonded to and supported by the "carbon paper" and which has its exposed face in contact with the electrolyte, is known as the catalytic layer. The catalytic layer, which is partially wettable to the electrolyte and is characterized by gas porosity, controls the electrolyte interface within the electrode and prevents flooding of the electrode which would result in damage and/or loss of power.

Because of its highly desirable chemical, electrical and mechanical properties, polytetrafluoroethylene (hereinafter PTFE) has long been recognized as a material which has great potential for use in fuel cell electrodes. In order to take advantage of the desirable properties of PTFE, the catalytic layer of an acid fuel cell may theoretically consist of a gas permeable layer formed from a dispersion of a catalyst and PTFE; the catalyst typically being a noble metal black such as platinum on carbon black. Prior art efforts to form such a PTFE based catalytic layer have relied upon the spherical particle shape of the PTFE to impart the requisite gas porosity to the layer. Thus, attempts have been made to rely upon a naturally formed or inherent porosity. In actual practice, because of the necessity of sintering the electrode to reduce pore size and thereby preclude flooding by the electrolyte, erratic results have been obtained. The poor results are believed to be caused by either the flowing of the PTFE and subsequent closing of the gas channels during sintering with a concomitant poor wetting of the catalyst by the electrolyte or by a tendency to flood resulting from insufficient sintering and concomitant excess electrolyte adsorption.

SUMMARY OF THE INVENTION

The present invention overcomes the above briefly discussed and other deficiencies and disadvantages of the prior art by providing a novel technique for the production of fuel cell electrodes. The present invention is also directed to the electrodes resulting from practice of this novel technique.

In its broadest aspect, the present invention consists of a process where agglomerates of PTFE which contain a pore former are employed. The co-agglomerates of PTFE particles and pore former particles replaces the PTFE suspensions previously employed which contain individually dispersed solid PTFE particles.

In accordance with the method of the present invention, positively charged particles of a pore former are mixed with a polymer so as to form polymer/pore former co-agglomerates. The pore former is selected so as to have a particle size not greater than the size of the polymer particles. The polymer/pore former co-agglomerates will be of small size and will be mixed with a catalyst suspension so as to form co-agglomerates of catalyst and polymer/pore former. The latter co-agglomerates are then distributed as a layer on a suitable electrode support plate, for example a "carbon paper", to form a fuel cell electrode by means of a process which includes pressing, drying and sintering. The pore former will be leached out of the electrodes subsequent to the layering.

The catalyst layer of an electrode produced in accordance with the above-described technique will be characterized by gas porosity only in the polymer portions thereof as a result of the pre-agglomerating of the polymer and pore former; this pre-agglomeration being permitted by the imparting of a positive charge to the pore former particles. The gas channels or pores in the polymer portions of the electrode will be uniformly distributed and of small size.

DESCRIPTION OF THE PREFERRED EMBODIMENT

In the practice of the method of the present invention, the first step to be performed is the production of a pore former having the appropriate particle size and, in order to permit agglomeration with polymer particles, a positive charge. The pore former most customarily employed in the production of a fuel cell electrode in accordance with the invention is zinc oxide (ZnO). Also in accordance with the present invention, the ZnO or other pore former material particles must be not greater in size than the diameter of the particles of the polymer with which the pore former will be co-agglomerated. The polymer will typically be polytetrafluoroethylene having an average particle diameter of 0.25 microns. Accordingly, the pore former particles will be selected so as to have a diameter in the range of 0.1 to 0.25 microns.

Since ZnO particles inherently have a negative charge such particles will not, as noted above, co-agglomerate with PTFE particles; PTFE also inherently having a negative charge. Accordingly, in order to positively charge the pore former particles, the pore former will be suspended in water by, for example, ultrasonic agitation. During this agitation a metal salt which will adsorb on the pore former and form a coating on the surface thereof will be added to the mixture. Particularly good results have been employed utilizing thorium nitrate $Th(NO_3)_4$ as this metal salt. Subsequent to addition of the metal salt, the acidity of the suspension is adjusted, typically to pH 8-9, to hydrolyze the salt. This hydrolization is performed by the addition of a suitable base, such as sodium hydroxide (NaOH). The addition of the base causes the metal salt to try to precipitate out of solution. Accordingly, the hydrolized metal salt forms a coating or an adsorption layer on the pore former particles. In the case where the pore former is ZnO and the metal salt is $Th(NO_3)_4$, it is believed the coating on the ZnO particles comprises $Th(OH)_4$.

The metal salt coated pore former particles have no charge. These particles; i.e., the flocculents of ZnO resulting from co-agglomeration of the pore former and metal salt; are filtered through a filter paper having approximately a 0.5 micron pore size and thereafter washed with water. The washing removes excess salts including the base utilized to adjust the pH of the pore former-metal salt solution. Subsequent to washing, the filtered ZnO flocculents are re-suspended in water which has been adjusted to pH 3 with a suitable acid. In the example being described, wherein the pore former is ZnO and the metal salt is $Th(NO_3)_4$, the acid will be 0.1N $HNO_3$. The acid is believed to attack the coating on the pore former particles; i.e., the acid will apparently remove hydroxides; so as to leave pore former particles having a positive charge. The coating on the pore former particles may be reduced to $Th^{4+}$, $Th(OH)^{3+}$, $Th(OH)_2^{2+}$ or $Th(OH)_3^{+}$. The re-suspension of the filtered ZnO flocculents is accomplished with the aid of ultrasonic agitation.

The next step in the practice of the present invention consists of the addition of the polymer to the suspension of positively charged pore former particles. As noted above, the polymer is preferably PTFE and particularly good results have been obtained employing a commercially available suspension of PTFE which includes surfactants; this suspension being known as TFE-42 and available from E. I. du Pont de Nemours Company. Although the amount by weight of PTFE will vary with the particle size of both the pore former and the PTFE, a ratio of 2.5 to 1 of ZnO to PTFE is typical. Because of the opposite charges on the PTFE and pore former particles, the particles will agglomerate and this agglomeration may be aided by stirring. Since the PTFE/pore former co-agglomerates will settle to the bottom of the solution, and it is desired that they remain in suspension, a wetting agent will be added and the mixture again ultrasonically agitated. The wetting agent or surfactant coats each of the PTFE/coated pore former co-agglomerates, which will be in the size range of 1 to 2 microns diameter, and permits the re-suspension of these co-agglomerates.

A catalyst suspension is thereafter added to the suspension of PTFE/pore former co-agglomerates, thorough mixing is accomplished and the catalyst/PTFE-pore former mixture is filtered. The coating of surfactant on the PTFE/pore former co-agglomerates also permits the intimate mixture of these co-agglomerates with the particles of catalyst. Subsequent to filtering the resulting filter cake is transferred onto "carbon paper" which has been treated with FEP fluorinated ethylene propylene copolymer; the "carbon paper" thus being wet proof. During the transfer the filter cake is pressed against and thus caused to bond to the "carbon paper". The "carbon paper" imparts the requisite structural integrity to the resulting fuel cell electrode.

The electrode is subsequently dried and sintered. After sintering the pore former is leached out by submersing the electrode in an acid which will attack the pore former material.

Turning now to a specific example of the production of a fuel cell electrode catalytic layer in accordance with the present invention, 50 milligrams of 0.1 micron diameter particles of ZnO were suspended in 150 ml of conductivity water; that is, water of the type customarily used for conductivity measurements and characterized by having a very low metal ion concentration; by ultrasonic agitation. Next, 0.014 grams of $Th(NO_3)_4 \cdot 4H_2O$ were added while agitating the mixture. The pH of the suspension was thereafter adjusted to pH 8-9 by the addition of 0.1 N NaOH. The resulting flocculents of ZnO were filtered through filter paper having an approximate 0.5 micron pore size and subsequently washed with water to remove the excess salts.

The ZnO flocculents were re-suspended in 150 ml conductivity water which had been adjusted to pH 3 with 0.1 N $HNO_3$. Thereafter, 20 mg of PTFE was added to the solution containing the re-suspended ZnO. In order to add the 20 mg of PTFE, approximately 40 mg of the du Pont TFE-42 suspension was added to the solution. The solution including the PTFE was stirred to aid in agglomeration of the PTFE/ZnO which settled to the bottom of the container. Next, 30 ml of a 0.15% "Triton DN-65" solution was added and the mixture was agitated ultrasonically to suspend the ZnO-PTFE co-agglomerates. The "Triton DN-65" is a surfactant available from Rohm & Haas Chemical Corporation. The ZnO-PTFE co-agglomerates will have diameters in the 1-2 micron range and each will be coated with the surfactant. Sufficient surfactant is added to permit the re-suspension of the co-agglomerates to thereby permit subsequent intimate mixture with the catalyst. Care must, of course, be taken against the addition of too much wetting agent as this would prevent the agglomeration of the ZnO-PTFE co-agglomerates with the catalyst.

The PTFE/ZnO co-agglomerates were subsequently mixed with a catalyst suspension to make an electrode catalytic layer. The porosity and pore size of the PTFE/ZnO mixture prepared as above was measured by filtering the re-suspended aggregates to form a layer. After sintering the layer was pressed at 330 lbs/cm.$^2$ and leached with 20% $H_2SO_4$ in iso-propanol. The iso-propanol is employed to wet the PTFE and thereby permit the acid to enter the electrode and attack the ZnO. The resulting catalytic layer was approximately 30 microns thick, showed negligible resistance to gas transport and was characterized by a uniform distribution of pores in the "Teflon" portions only; these pores being approximately 0.1 micron in diameter.

In a second example, 30 mg of 0.1 micron diameter ZnO particles were suspended in 50 ml of conductivity water by ultrasonic agitation. Thereafter 1.5 ml of 0.01N $Th(NO_3)_4.4H_2O$ were added while agitating the suspension. The pH of the solution was then adjusted to pH 8-9 with 0.1N NaOH. The resulting flocculate of ZnO was filtered, as described above, and washed with water. The ZnO flocculates were re-suspended in 100 ml of conductivity water which had been adjusted to pH 3 with 0.1N HNO. Thereafter, while stirring, 12 mg of PTFE, in the form of TFE-42 was added. When agglomeration was complete 15 ml of 0.15% "Triton DN-65" solution was added and thorough mixing was achieved by stirring followed by ultrasonic agitation to cause re-suspension.

Subsequent to re-suspension, 30 mg of catalyst was added and intimate mixing was achieved by stirring and agitating ultrasonically. The catalyst was 12.5% Pt/VULCAN; this being a commercially available catalyst comprising platinum on carbon black. The catalyst-PTFE/ZnO mixture was thereafter filtered through 0.5 micron filter paper and the filter cake was transferred onto FEP treated "carbon paper" by pressing. The resulting electrode structure was dried at 100° C. and sintered at 340° C. for ten minutes. Thereafter, the ZnO was leached out by submersing the electrode in a 20% $H_2SO_4$/iso-propanol mixture. To insure complete leaching of the ZnO, it may in some cases be desirable to wash the electrode and then perform a second leaching step by submersing it in 50% $HNO_3/H_2O$. The technique described above produced a 6 sq. cm electrode.

Electrodes produced in the manner described above have greater resistance to flooding at open circuit air potentials than has characterized prior art electrodes. Platinum on "Vulcan" electrodes made by prior art procedures can not tolerate open circuit air potentials for any length of time without flooding whereas platinum on "Vulcan" electrodes made as described above showed little or no flooding after several hours at open circuit air potentials.

While a preferred embodiment has been described above, various modifications and substitutions may be made thereto without departing from the spirit and scope of the invention. Accordingly, it will be understood that the present invention has been described by way of illustration and not limitation.

What is claimed is:

1. A method for the manufacture of polymer sheet material characterized by gas porosity comprising the steps of:
   providing a dispersion comprising nonwettable thermoplastic halogenated hydrocarbon polymer particles having a predetermined average diameter;
   providing a pore former comprising a material which is capable of being attacked by an etchant which will not attack the polymer, the pore former being in the form of particles having an average diameter which is not greater than the average diameter of the polymer particles;
   suspending the pore former particles in a solution comprising metal salt;
   adjusting the pH of the solution to hydrolize the metal salt;
   forming a coating comprising said hydrolized metal salt on the pore former particles to provide coated pore former particles having an electrical charge which is opposite to the charge of the polymer particles;
   mixing said polymer dispersion and the pore former particles to provide agglomerated particles comprising the pore former particles and the polymer particles;
   forming a layer comprising the agglomerated particles, the pore former particles and the polymer particles uniformly distributed throughout the layer; and
   leaching the pore former particles from the layer to form gas channels therein, said layer being resistant to wetting.

2. A method according to claim 1 wherein the step of forming said coating on the pore former particles comprises suspending the coated pore former particles in an acidic solution which attacks the hydrolized metal salt coating to provide coated pore former particles having a positive charge.

3. A method according to claim 2 wherein the polymer dispersion comprises an aqueous dispersion of polytetrafluoroethylene.

4. A method according to claim 3 wherein the solution of metal salt comprises $Th(NO_3)_4$ and the pore former particles comprise zinc oxide.

5. A method according to claim 4 wherein the pH is adjusted by adding sodium hydroxide to hydrolize the metal salt.

6. A method according to claim 5 wherein the coated pore former particles are removed from the solution and are washed to remove the sodium hydroxide and further including resuspending the coated pore former particles in solution and adjusting the pH of the solution with nitric acid to thereby attack the coating on the pore former particles and remove hydroxide so as to leave the pore former particles with a positive charge.

7. A method according to claim 6 wherein subsequent to forming the layer, the layer is sintered.

* * * * *